United States Patent [19]
Denton et al.

[11] Patent Number: 5,708,502
[45] Date of Patent: Jan. 13, 1998

[54] RANDOM ACCESS CHARGE TRANSFER DEVICES FOR MULTI-ELEMENT ATOMIC ABSORPTION SPECTROMETRY AND TEMPORAL SHIFTING

[75] Inventors: M. Bonner Denton; J. Bruce True, both of Tucson, Ariz.

[73] Assignee: Thermo Jarrell Ash Corporation, Franklin, Mass.

[21] Appl. No.: 609,777

[22] Filed: Mar. 1, 1996

[51] Int. Cl.⁶ ..................................................... G01J 3/30
[52] U.S. Cl. ........................................ 356/312; 356/326
[58] Field of Search ................................. 356/326, 328, 356/312; 348/311, 317, 320, 321, 316; 250/208.1

[56] References Cited

PUBLICATIONS

Bilhorn et al; "Elemental Analysis with a Plasma Emission—Echelle Spectrometer Employing a Charge Injection Device (CID) Detector", Applied Spectroscopy, vol. 43, No. 1 1989.

Bilhorn, Robert B., "Analytical Spectroscopic Capabilities of Optical Imaging Charge Transfer Devices"; Ph.D. Dissertation; pp. 43–44; 1987.

Haswell, S.J.; "Instrumental Requirements and Optimization"; Atomic Absorption Spectrometry; Elsevier; New York; pp. 48–49; 1991.

Welz, Bernhard; Atomic Absorption Spectrometry; VCH Publishers; Deerfield Beach, Florida; pp. 131–135 ("Molecular Band Overlap and Radiation Scattering on Particles"); 1985.

Harnly, James M.; "Instrumentation for Simultaneous Multielement Atomic Absorption Spectrometry with Graphite Furnace Atomization"; Fresenius J. Anal. Chem. 355; pp. 501–509; 1996.

Harnly, James M.; "Graphite Furnace Atomic Absorption Spectrometry Using a Linear Photodiode Array and a Continuum Source"; Journal of Analytical Atomic Spectrometry; vol. 8; pp. 317–324; Mar., 1993.

Harnly, James M.; "Multielement Atomic Absorption with a Continuum Source"; Analytical Chemistry; vol. 58, No. 8; pp. 933 A through 943 A; Jul., 1986.

Hsiech, Churming et al.; "Continuum–Source Atomic Absorption Spectroscopy with an Echelle Spectrometer Adapted to a Charge Injection Device"; Analytical Chemistry; vol. 62, No. 18; pp. 1983–1988; Sep. 15, 1990.

Perkin Elmer Corporation; "SIMAA 6000 Atomic Absorption Spectrometer".

*Primary Examiner*—K. Hantis
*Attorney, Agent, or Firm*—Fish & Richardson P.C.

[57] ABSTRACT

A simultaneous multi-element atomic absorption spectrometry system includes a light source, a furnace, a spectrometer, and a random access charge transfer device. The furnace creates vapors of a sample contained within the furnace. The light source passes a light beam through the furnace so that wavelengths of the light beam corresponding to spectral lines of multiple elements contained in the vapors are absorbed by the vapors. The spectrometer receives the light beam after the light beam has passed through the furnace, and disperses the light beam into a spectrum. The random access charge transfer device receives the light beam after the light beam has passed through the spectrometer, integrates and stores charge corresponding to the intensity of the light beam, and randomly accesses for readout subarrays of the random access charge transfer device corresponding to spectral lines of the multiple elements. The spectrometry system also includes an optical apparatus that receives the light beam and shifts the light beam between a first and a second position.

18 Claims, 2 Drawing Sheets

RANDOM ACCESS CHARGE TRANSFER DEVICES FOR MULTI-ELEMENT ATOMIC ABSORPTION SPECTROMETRY AND TEMPORAL SHIFTING

REFERENCE TO APPENDIX

This application includes an Appendix A, which includes macro-code written for the CID controller described below.

BACKGROUND OF THE INVENTION

The present invention relates to random access charge transfer devices for use in multi-element atomic absorption spectrometry and temporal shifting and more particularly to the use of such devices in connection with graphite furnace atomic absorption (GFAA) spectrometry combined with the use of temporal spectral shifting.

Single-element GFAA spectrometers are known for detecting the presence or concentration of a single element in a sample that is placed in a graphite furnace. The graphite furnace creates a vapor from the sample, and if the element is present in the vapor, at least one spectral line of a light beam that is caused to pass through the vapor will be absorbed. A detection instrument measures the absorption of light at the wavelength corresponding to the spectral line for the purpose of detecting the presence or concentration of the element. Single-element graphite furnaces are useful, for example, in performing analyses of food or drinking water where the government requires that contaminants such as arsenic, lead, mercury, or cadmium be below a certain concentration. Often, a single instrument is dedicated to cadmium, a single instrument is dedicated to lead, and so on, or, if only one instrument is available, it can be reconfigured and optimized for a second or third element.

It is also known to implement a multi-element GFAA spectrometer using a broad-band light source and a detector that measures the absorbance of light at a plurality of wavelengths corresponding to spectral lines of a plurality of elements for the purpose Of detecting the presence or concentration of the plurality of elements. One approach is to place diode arrays at locations corresponding to the spectral lines.

The process of measuring the absorbance of light in a GFAA spectrometer typically consists of a two-stage process. First, the detection element integrates and stores charge corresponding to light of a pertinent wavelength projected onto the detection element, and then the stored charge is read out of the detection element. The integration proceeds again and the process repeats itself such that an absorbance profile of the transient absorption signal can be obtained as a function of time.

SUMMARY OF THE INVENTION

The present invention provides features that increase both the speed of operation and flexibility of multi-element GFAA spectrometers.

One aspect of the invention features a simultaneous multi-element atomic absorption spectrometry system, comprising a light source, a furnace, a spectrometer, and a random access charge transfer device. The furnace creates vapors of a sample contained within the furnace. The light source passes a light beam through the furnace so that wavelengths of the light beam corresponding to spectral lines of multiple elements contained in the vapors are absorbed by the vapors. The spectrometer receives the light beam after the light beam has passed through the furnace, and disperses the light beam into a spectrum. The random access charge transfer device receives the light beam after the light beam has passed through the spectrometer, integrates and stores charge corresponding to the intensity of the light beam, and randomly accesses for readout subarrays of the random access charge transfer device corresponding to spectral lines of the multiple elements.

By using a random access charge transfer device arranged to receive the light beam after the light beam has passed through the spectrometer, the invention makes it possible to randomly access areas of the charge transfer device for integration or reading, thereby providing the flexibility that enables the apparatus to be used to measure the absorbance of wavelengths corresponding to numerous different combinations of elements rather than one specific predetermined combination of elements and enables the apparatus to project any of numerous different spectral regions onto the charge transfer device rather than one specific predetermined spectral region. Also, the random access charge transfer device can be used to collectively read out areas that include a plurality of pixels, thereby increasing the overall speed of the apparatus. Because it is possible to perform multiple non-destructive reads using a random access charge transfer device, the signal to noise ratio can be improved. Moreover, the random access charge transfer device can be used to integrate charge in one area of the charge transfer device while charge is read out of another area of the charge transfer device, preferably a number of times, in accordance with the temporal shifting technique described below, which increases the readout rate.

Another aspect of the invention features a system for analyzing an image, comprising an optical apparatus, a random access charge transfer device, and a controller. The optical apparatus receives a light beam and shifts the light beam between a first and a second position. The random access charge transfer device receives the light beam from the optical apparatus, the light beam forming a first image on the random access charge transfer device corresponding to the first position of the light beam and a second image on the random access charge transfer device corresponding to the second position of the light beam. The second image is displaced with respect to the first image. The controller is configured, while the light beam is in the first position, to cause charge to be integrated and stored within the random access charge transfer device representing at least a portion of the first image and simultaneously to cause stored charge representing at least a portion of the second image to be read from the random access charge transfer device, and, while the light beam is in the second position, to cause charge to be integrated and stored within the random access charge transfer device representing at least the portion of the second image and simultaneously to cause stored charge representing at least the portion of the first image to be read from the random access charge transfer device.

By shifting the light beam between a first and a second position, the invention makes it possible in effect to increase readout rate because reading of one image occurs while the other image (which may be identical to the first image) is being integrated. This aspect of the invention is useful in multi-element atomic absorption spectrometry because the spectral image on the random access charge transfer device can be shifted from one location to another location in which the orders of the spectrum fall in spaces between the locations of the orders in the first location. This aspect of the invention is also useful in other applications as well where, for example, an optical event is to occur at a known location at a known time, in which case the light beam is shifted

DETAILED DESCRIPTION

Figure 1:
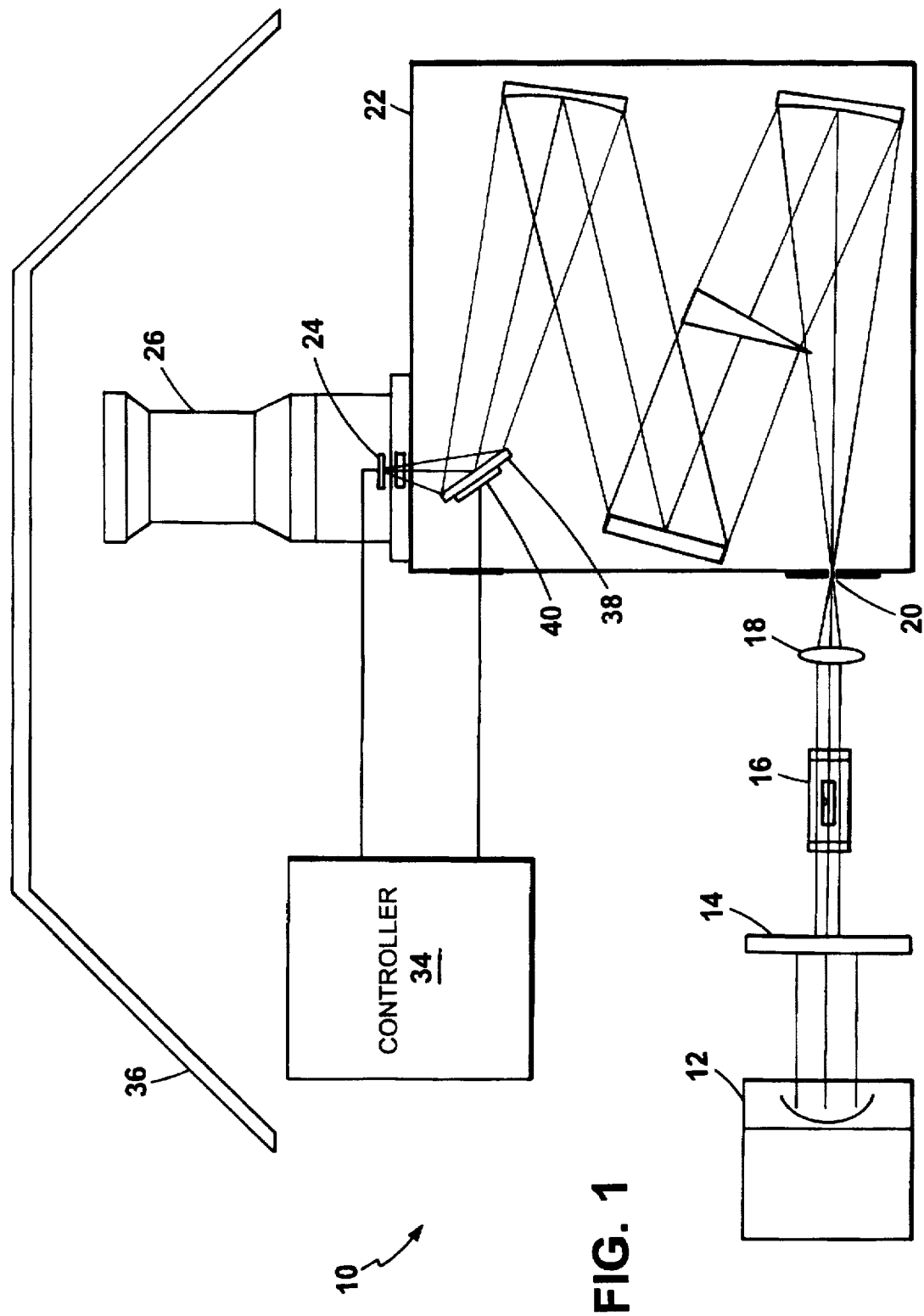
FIG. 1 is a diagram of a simultaneous multi-element GFAA spectrometry system in accordance with the invention.

With reference to FIG. 1, in simultaneous multi-element continuum source GFAA spectrometry system 10, which is vented and enclosed by hood 36, absorption lines from multiple elements within a single graphite furnace atomization cell 16 (CTF 188 system from Thermo Jarrell Ash Corporation) can be simultaneously observed using simultaneous wavelength detection with charge injection device 24. Xenon arc lamp 12 (model 300W from Varian) produces a continuum-source, high-intensity, broad-band light beam, which is irised down by irising element 14 to a ½" diameter beam in order to prevent ultraviolet degradation of the plastic and rubber portions of the atomization head of graphite furnace atomization cell 16, through which the light beam passes roughly collimated. Achromatic lens 18 focuses the light beam onto entrance slit 20 of echelle spectrometer 22.

Figure 2:
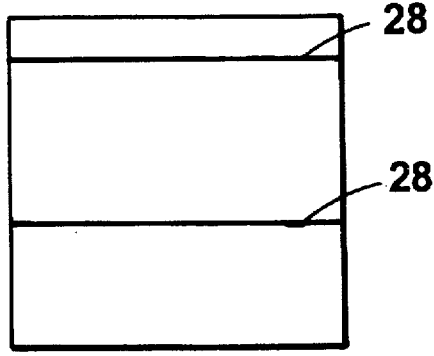
FIG. 2 is a diagram illustrating the relative positions of two orders of a spectrum projected onto a CID sensor of a simultaneous multi-element GFAA spectrometry system during the charge integration process, where temporal spectral shifting is not being utilized.

Echelle spectrometer 22 disperses the light beam into a high-dispersion spectrum that is divided into a set of high-resolution orders having spaces between the orders, and the orders are projected onto CID sensor 24 of camera 26. Two such orders are represented by horizontal lines 28 in FIG. 2. The wavelength of the light projected onto the CID sensor 24 varies gradually from one end to the other end of each horizontal order, and then the spectrum continues within an adjacent order. Echelle spectrometer 22 disperses the spectrum in a manner such that the dispersion in the vertical direction, between the orders, is sufficiently large to allow space for another order (created by the temporal spectral shifting technique described below), as represented by horizontal lines 30 in FIG. 4.

During the charge reading process, a given absorption peak on CID sensor 24 corresponding to a spectral line of interest is encompassed by, for example, a software-generated 3×4 window having two software-generated 3×4 side windows on either side of the absorption peak that are used to determine $I_0$ (background intensity). The two side windows are separated from the center window by gaps. In order to determine the mass of the unknown analyte in the vapor within the GFAA furnace, the average of the stored charge in the two side windows ($I_0$) is divided by the stored charge in the center window (the intensity of the absorbance at the wavelength of interest). The logarithm of this ratio is proportional to the unknown mass.

Figure 3:
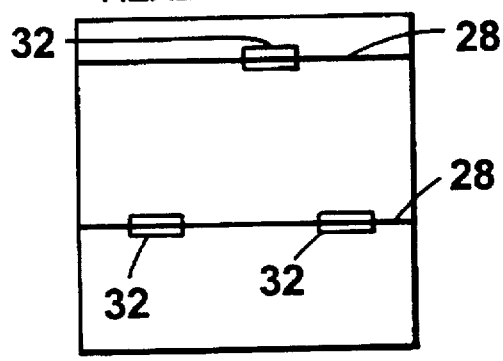
FIG. 3 is a diagram illustrating the relative positions of three read windows on the two orders of FIG. 2 during the charge reading process.

The absorption peak window and the two side windows together form a software-generated subarray read window for each wavelength of interest. Three such subarray read windows 32 are illustrated in FIG. 3.

Because CID sensor 24 features random access reading, only the subarray read windows need be read out of the CID sensor after integration. In addition, CID sensor 24 has the capability of collective readout of multiple pixels simultaneously. This can be accomplished by summing together the outputs of a plurality of rows or columns of pixels, as is explained in detail in co-pending U.S. patent application Ser. No. 08/592,789, filed Jan. 26, 1996 by Joseph Carbone et al. and entitled "Collective Charge Reading and Injection in Random Access Charge Transfer Devices," the entire disclosure of which is hereby incorporated herein by reference. Moreover, because the CID sensor can be read non-destructively, multiple readouts of a given read window can be performed and the results averaged for noise reduction. These features together help provide a high signal-to-noise ratio at a high readout rate.

CID sensor 24 is operated by a SiCAM controller 34 (from CID Technologies Inc.) with custom macro-code. The attached Appendix A includes the macro-code written for the CID controller for reading out multiple subarrays rapidly as well as a "readme" file summarizing the available routines. This macro-code consists of modifications to CID Technologies Inc.'s SCM 5000 Macro Code. The routines allow many subarrays of the same size to be read out at the maximum possible speed, with each subarray having a time stamp from the 1 ms timer of controller 34. A global knockdown can be made to occur at regular intervals during the readout cycle.

In one method of spectral analysis, which does not utilize temporal spectral shifting, the absorbance and background of each wavelength of interest are sampled at about 50–100 Hz in order to obtain a reasonable absorbance profile that sufficiently characterizes the transient absorption signal. Each subarray read window is read continuously. The subarray read windows are monitored and knocked down (injected) selectively as soon as they are near full well capacity, by means of the random access charge injection capability of the CID sensor. Multiple nondestructive reads can be utilized to eliminate read noise and simultaneous background correction provides low source noise.

Figure 4:
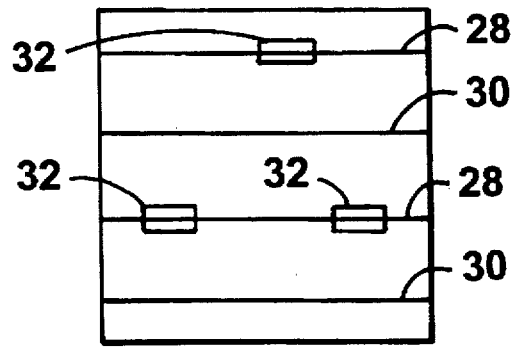
FIG. 4 is a diagram illustrating the relative positions of two pairs of orders, corresponding to an image that is being integrated and an image that is being read, as well as the positions of three read windows, in a first stage of a simultaneous charge integration and charge reading process of a simultaneous multi-element GFAA spectrometry system that incorporates temporal spectral shifting.
Figure 5:
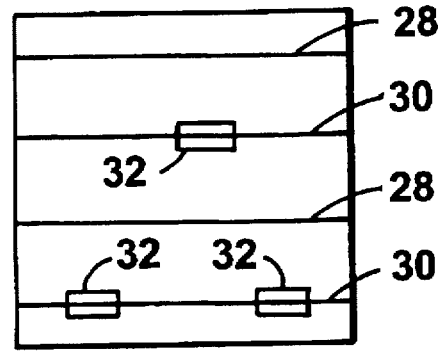
FIG. 5 is a diagram illustrating the relative positions of the two pairs of orders and the three read windows of FIG. 4 during the second stage of the simultaneous charge integration and charge reading process.

Another method of spectral analysis, illustrated by FIGS. 4 and 5, increases the readout rate and allows nondestructive reads without sacrificing readout noise. Even though the echelle spectrometer takes advantage of the two-dimensional detection scheme to pack a substantial amount of spectral information (typically 200 to 800 nm) onto a single CID sensor, there is still some dead space on the CID sensor that corresponds to the area in-between individual orders. This dead space could be used to store more spectral information by allowing another order to fall on it, but in the method of FIGS. 4 and 5 it is instead used to store temporal information by having one order fall on two locations of the sensor at two different times.

In particular, after integrating the CID sensor for 20 milliseconds, the location of the echelle image is shifted downward so that the orders 30 now fall in-between the location of the old orders 28, and then the CID can be integrated for another 20 milliseconds. The CID sensor now contains two echellograms corresponding to two different 20 millisecond time periods. While the second image is integrating, the first image is read out. Because there is no light hitting the locations of the first image, the first image can be read non-destructively as many times as possible in the 20 millisecond time period.

Critical to this technique, called spectral temporal shifting, is the design of the echelle spectrometer. The dispersion in the vertical direction (between the orders) must be large enough to allow space for another order. This distance needs to be 5 to 10 pixels, or about 100 to 200 μm at the focal plane of the exit. This requirement may sacrifice some spectral range, but only in the red where the dispersion is least and the orders are close together. The echelle spectrometer can still cover most of the visible and all of the ultraviolet (about 180 to 500 nm), which contains most of the useful wavelengths for atomic absorption spectrometry.

A kicker mirror 38 attached to a piezoelectric transducer 40 performs the actual shifting of the location of the echelle image. The piezoelectric transducer can accurately and reproducibly position kicker mirror 38 quickly enough so that there is no blurring of the echelle images. Piezoelectric transducer 40 is synchronized with controller 34. Alternatively, instead of repositioning kicker mirror 38, any other optical component of echelle spectrometer 22, such as the entrance slit, the grating, the prism, or any of the mirrors, can be repositioned. Alternatively, a system of two slits can be provided to switch the light between the two positions.

There have been described new and useful apparatus and techniques for multi-element atomic absorption spectrometry and temporal shifting. It is evident that those skilled in the art may now make numerous uses and modifications of and departures from the specific embodiments described herein without departing from the inventive concept. For example, other random access charge transfer devices such as pre-amp per pixel (PPP) devices (sometimes referred to as active pixel sensors) may be substituted for the charge injection devices described herein, and other timing specifications may be substituted for the timing specifications described herein.

What is claimed is:

1. A simultaneous multi-element atomic absorption spectrometry system, comprising:

a light source;

a furnace for creating vapors of a sample contained within said furnace, said light source being arranged to pass a light beam through said furnace so that wavelengths of said light beam corresponding to spectral lines of multiple elements contained in said vapors are absorbed by said vapors;

a spectrometer arranged to receive said light beam after said light beam has passed through said furnace, and to disperse said light beam into a spectrum;

a random access charge transfer device arranged to receive said light beam after said light beam has passed through said spectrometer, to integrate and store charge corresponding to the intensity of said light beam, and to randomly access for readout subarrays of said random access charge transfer device corresponding to spectral lines of said multiple elements; and an optical apparatus configured to receive said light beam and to shift said light beam between a first and a second position, said light beam forming a first image on said random access charge transfer device corresponding to said first position of said light beam and a second image on said random access charge transfer device corresponding to said second position of said light beam, said second image being displaced with respect to said first image; and a controller configured, while said light beam is in said first position, to cause charge to be integrated and stored within a subarray of said random access charge transfer device corresponding to a portion of said first image that is a spectral line of one of said multiple elements, and, while said light beam is in said second position, to cause charge to be integrated and stored within another subarray of said random access charge transfer device corresponding to a portion of said second image that is also said spectral line of said one of said multiple elements, said controller further being configured to cause stored charge representing said portion of said first image and said portion of said second image to be read from said random access charge transfer device.

2. A system in accordance with claim 1, wherein said controller is configured, while said light beam is in said first position, to cause stored charge representing at least said portion of said second image to be read and simultaneously to cause charge within said random access charge transfer device representing at least said portion of said first image to be integrated and stored, and, while said light beam is in said second position, to cause stored charge representing at least said portion of said first image to be read from said random access charge transfer device and simultaneously to cause charge within said random access charge transfer device representing at least said portion of said second image to be integrated and stored.

3. A system in accordance with claim 1, wherein said random access charge transfer device is further configured to collectively read pixels within said subarrays simultaneously.

4. A system in accordance with claim 1, wherein said random access charge transfer device is further configured to read out said subarrays non-destructively a plurality of times.

5. A system in accordance with claim 1, wherein said random access charge transfer device is further configured to monitor charge stored in each of said subarrays and to erase said charge stored in any one of said subarrays when said one of said subarrays is near full well capacity.

6. A system in accordance with claim 1, wherein said furnace comprises a graphite furnace.

7. A system in accordance with claim 1, wherein said random access charge transfer device comprises a charge injection device.

8. A simultaneous multi-element atomic absorption spectrometry system, comprising:

a light source;

a furnace for creating vapors of a sample contained within said furnace, said light source being arranged to pass a light beam through said furnace so that wavelengths of said light beam corresponding to spectral lines of multiple elements contained in said vapors are absorbed by said vapors;

a spectrometer arranged to receive said light beam after said light beam has passed through said furnace, and to disperse said light beam into a spectrum;

a random access charge transfer device arranged to receive said light beam after said light beam has passed through said spectrometer, to integrate and store charge corresponding to the intensity of said light beam, and to randomly access for readout subarrays of said random access charge transfer device corresponding to spectral lines of said multiple elements; and an optical apparatus configured to receive said light beam and to shift said light beam between a first and a second position, said light beam forming a first image on said random access charge transfer device corresponding to said first position of said light beam and a second image on said random access charge transfer device corresponding to skid second position of said light beam, said second image being displaced with respect to said first image; and a controller configured, while said light beam is in said first position, to cause charge to be integrated and stored within said random access charge transfer device representing at least a portion of said first image and simultaneously to cause stored charge representing at least a portion of said second image to be read from said random access charge transfer device, and, while said light beam is in said second position, to cause charge to be integrated and stored within said random access charge transfer device representing at least a portion of said second image and simultaneously to cause stored charge representing at least a portion of said first image to be read from said random access charge transfer device; wherein:

said spectrometer disperses said light beam into a spectrum comprising a plurality of orders separated by spaces;

said first and second images each comprise a plurality of orders of said spectrum; and said second image is displaced with respect to said first image such that the orders of said second image are interspaced between the orders of said first image.

9. A method of operating a multi-element atomic absorption spectrometry system, comprising the steps of:

producing a light beam from a light source;

passing said light beam through a furnace that creates vapors of a sample contained within said furnace so that wavelengths of said light beam corresponding to spectral lines of multiple elements contained in said vapors are absorbed by said vapors;

passing said light beam through a spectrometer, after said light beam has passed through said furnace, that disperses said light beam into a spectrum;

projecting said light beam dispersed into said spectrum onto a random access charge transfer device;

shifting said light beam between a first and a second position, said light beam forming a first image on said random access charge transfer device corresponding to said first position of said light beam and a second image on said random access charge transfer device corresponding to said second position of said light beam, said second image being displaced with respect to said first image;

while said light beam is in said first position, integrating and store charge within a subarray of said random access charge transfer device corresponding to a portion of said first image that is a spectral line of one of said multiple elements;

while said light beam is in said second position, integrating and storing charge within another subarray of said random access charge transfer device corresponding to a portion of said second image that is also said spectral line of said one of said multiple elements; and randomly accessing for readout said subarrays of said random access charge transfer device corresponding to said spectral line of said one of said multiple elements.

10. A method in accordance with claim 9, further comprising the steps of:

while said light beam is in said first position, reading stored charge representing at least said portion of said second image and simultaneously integrating and storing charge within said random access charge transfer device representing at least said portion of said first image; and while said light beam is in said second position, reading from said random access charge transfer device stored charge representing at least said portion of said first image and simultaneously integrating and storing charge within said random access charge transfer device representing at least said portion of said second image.

11. A system in accordance with claim 9, further comprising the step of collectively reading pixels within said subarrays simultaneously.

12. A system in accordance with claim 9, further comprising the step of reading out said subarrays nondestructively a plurality of times.

13. A system in accordance with claim 9, further comprising the steps of monitoring charge stored in each of said subarrays and erasing said charge stored in any one of said subarrays when said one of said subarrays is near full well capacity.

14. A method of operating a multi-element atomic absorption spectrometry system, comprising the steps of:

producing a light beam from a light source;

passing said light beam through a furnace that creates vapors of a sample contained within said furnace so that wavelengths of said light beam corresponding to spectral lines of multiple elements contained in said vapors are absorbed by said vapors;

passing said light beam through a spectrometer, after said light beam has passed through said furnace, that disperses said light beam into a spectrum;

projecting said light beam dispersed into said spectrum onto a random access charge transfer device;

shifting said light beam between a first and a second position, said light beam forming a first image on said random access charge transfer device corresponding to said first position of said light beam and a second image on said random access charge transfer device corresponding to said second position of said light beam, said second image being displaced with respect to said first image;

while said light beam is in said first position, integrating and store charge within said random access charge transfer device representing at least a portion of said first image while simultaneously randomly accessing for readout subarrays of said random access charge transfer device corresponding to spectral lines of said multiple elements including at least a portion of said second image;

while said light beam is in said second position, integrating and storing charge within said random access charge transfer device representing at least a portion of said second image while simultaneously randomly accessing for readout subarrays of said random access charge transfer device corresponding to spectral lines of said multiple elements including at least a portion of said first image; wherein:

said step of passing said light beam through said spectrometer comprises dispersing said light beam into a spectrum comprising a plurality of orders separated by spaces;

said first and second images each comprise a plurality of orders of said spectrum; and said second image is displaced with respect to said first image such that the orders of said second image are interspaced between the orders of said first image.

15. A system for analyzing an image, comprising:

an optical apparatus configured to receive a light beam and to shift said light beam between a first and a second position;

a random access charge transfer device arranged to receive said light beam from said optical apparatus, said light beam forming a first image on said random access charge transfer device corresponding to said first position of said light beam and a second image on said random access charge transfer device corresponding to said second position of said light beam, said second image being displaced with respect to said first image; and a controller configured, while said light beam is in said first position, to cause charge to be integrated and stored within said random access charge transfer device representing at least a portion of said first image and simultaneously to cause stored charge representing at least said portion of said second image to be read from said random access charge transfer device, and, while said light beam is in said second position, to cause charge to be integrated and stored within said random access charge transfer device representing at least a portion of said second image and simultaneously to cause stored charge representing at least said portion of said first image to be read from said random access charge transfer device.

16. A system in accordance with claim 15, wherein said second image is identical to said first image.

17. A system in accordance with claim 15, wherein said portion of said second image is identical to said portion of said first image.

18. A method of analyzing an image, comprising the steps of:

providing a light beam;

projecting said light beam onto an optical apparatus that causes said light beam to be projected in a first position onto a random access charge transfer device to form a first image, while integrating and storing charge within said random access charge transfer device representing at least a portion of said first image; and continuing to project said light beam onto said optical apparatus while said optical apparatus shifts said light beam to project said light beam in a second position onto said random access charge transfer device to form a second image, while integrating and storing charge within said random access charge transfer device representing at least a portion of said second image;

said step of integrating and storing charge within said random access charge transfer device representing at least said portion of said first image being performed while stored charge representing at least said portion of said second image is simultaneously read from said random access charge transfer device;

said step of integrating and storing charge within said random access charge transfer device representing at least said portion of said second image being performed while stored charge representing at least said portion of said first image is simultaneously read from said random access charge transfer device.

* * * * *